· US006210451B1

(12) United States Patent
Chopin et al.

(10) Patent No.: US 6,210,451 B1
(45) Date of Patent: Apr. 3, 2001

(54) COLLOIDAL ORGANIC SOLS COMPRISING TETRAVALENT METAL OXIDE/ORGANIC ACID COMPLEXES

(75) Inventors: Thierry Chopin, Saint-Leu la Foret; Pierre Macaudiere, Asnieres/Seine; Olivier Touret, La Rochelle, all of (FR)

(73) Assignee: Rhone-Poulenc Chimie, Courbevoie Cedex (FR)

( * ) Notice: Subject to any disclaimer, the term of this patent is extended or adjusted under 35 U.S.C. 154(b) by 0 days.

(21) Appl. No.: 09/401,966

(22) Filed: Sep. 22, 1999

Related U.S. Application Data

(63) Continuation of application No. 08/868,675, filed on Jun. 4, 1997, now abandoned, which is a continuation of application No. 08/391,534, filed on Feb. 21, 1995, now abandoned.

(51) Int. Cl.$^7$ ................................ B01F 3/12; C10L 1/12
(52) U.S. Cl. .............................. 44/357; 423/263; 516/33
(58) Field of Search ........................... 44/502, 503, 357; 516/33, 98; 423/263

(56) References Cited

U.S. PATENT DOCUMENTS

| 4,231,893 | * | 11/1980 | Woodhead | 423/263 X |
| 4,545,923 | | 10/1985 | Gradeff et al. | |
| 4,647,401 | | 3/1987 | Gradeff et al. | |
| 4,699,732 | * | 10/1987 | Woodhead | 423/263 X |
| 4,886,624 | | 12/1989 | Gradeff et al. | |
| 5,021,192 | * | 6/1991 | David et al. | 423/263 X |
| 5,132,048 | * | 7/1992 | Picard-Seon et al. | 423/263 X |
| 5,376,304 | * | 12/1994 | Yamamoto et al. | 423/263 X |
| 5,389,298 | * | 2/1995 | Grosbois | 423/263 X |

FOREIGN PATENT DOCUMENTS

| 0097563 | 1/1984 | (EP) . |
| 0206907 | 12/1986 | (EP) . |
| 0238367 | 9/1987 | (EP) . |
| 0300851 | 1/1989 | (EP) . |
| 2698346 | 5/1994 | (FR) . |
| 2075478 | 11/1981 | (GB) . |
| 7900248 | 5/1979 | (WO) . |

* cited by examiner

Primary Examiner—Richard D. Lovering
(74) Attorney, Agent, or Firm—Burns, Doane, Swecker & Mathis, L.L.P.

(57) ABSTRACT

Storage-stable colloidal organic sols comprise suspended tetravalent metal oxide particulates in an organic diluent medium, notably cerium dioxide particulates, the tetravalent metal oxide particulates having a particle size $d_{90}$ no greater than 200 nanometers and being complexed with at least one amphiphilic organic acid, and either said tetravalent metal oxide particulates comprising agglomerates of crystallites, the $d_{80}$ of which being no greater than 5 nanometers and at least 90% of said agglomerates comprising from 1 to 5 crystallites, and/or said at least one amphiphilic organic acid has from 11 to 50 carbon atoms and is branched in at least one of the $\alpha$-, $\beta$-, $\gamma$- or $\delta$-positions relative to the atom bearing the acidic hydrogen.

103 Claims, No Drawings

COLLOIDAL ORGANIC SOLS COMPRISING TETRAVALENT METAL OXIDE/ORGANIC ACID COMPLEXES

CROSS-REFERENCE TO COMPANION APPLICATIONS

This application is a continuation of application Ser. No. 08/868,675, filed Jun. 4, 1997, and now abandoned which is a continuation of application Ser. No. 08/391,534, filed Feb. 21, 1995 and now abandoned.

Other applications having similar subject matter include copending application Ser. No. 08/173,484, filed Dec. 27, 1993, itself a continuation of Ser. No. 07/832,830, filed Feb. 5, 1992 and now abandoned, in turn a continuation of Ser. No. 07/451,772, filed Dec. 18, 1989 and also now abandoned, in its turn a division of Ser. No. 07/316,430, filed Feb. 27, 1989, also now abandoned.

BACKGROUND OF THE INVENTION

1. Field of the Invention

The present invention relates to novel colloidal organic sols comprising tetravalent metal oxide/organic acid complexes, in particular those of cerium oxide, and, more especially, to such organic sols having great stability and controlled particle size.

2. Description of the Prior Art

Colloidal suspensions in organic media of micrometric or submicronic particles are known to this art, the properties of these colloidal suspensions being similar to those of pure solutions. These colloidal suspensions are generally designated by the term "sols."

These sols had the property either of being stable with time and being of coarse particle size (in general, hydrodynamic diameter on the order of one micrometer and high viscosity), or being of fine particle size but of low stability: half-life duration at most equal to one or two months, and of relatively low concentration. However, to date, as far as is known these properties have not been simultaneously obtained.

For certain applications, the aforesaid properties are essential. More particularly for the reasons hereinbelow outlined, the use of the sols as additives for fuels for internal combustion engines requires both the option of existing in a high concentration and the necessity of having a low particle size and a very high stability.

The use of the sols as additives for diesel engines is a representative example of the constraints to which such a sol must comply.

During the burning of diesel fuel in diesel engines, the carbon-containing products of combustion have a tendency to form soots which are considered harmful both to the environment and to human health. It has long been sought to reduce the emission of these carbon-containing particles, hereinafter sometimes referred to simply as "soots." The research in this area takes account of the necessity of not increasing the emission of carbon monoxide and of gases which are considered toxic and mutagenic, such as nitrogen oxides.

A great many solutions have been proposed for reducing these carbon-containing emissions.

However, attention is increasingly focused on fitting the exhaust systems of internal combustion engines with a filter capable of trapping all, or a very high proportion (at least 80% by mass) of the carbon-containing particles generated by the combustion of the various fuels. This technique is, however, limited by the storage capacity of the filter (or trap); it is necessary either to empty the filter or to incinerate the soots contained therein. This operation, known as regeneration, is extremely expensive and difficult to implement. One of the most commonly proposed solutions is the combustion of these soots, which combustion is intermittently carried out either by electrical heating or by use of a fossil igniter fuel.

Nonetheless, this technique presents many disadvantages, not the least of which is the risk of thermal shock leading to fracturing or cracking of the ceramic filter, or to melting of the metal filter.

One solution which would be satisfactory entails introducing catalysts into the soots which make possible frequent self-ignition of the soots collected in the filter. To accomplish this, it is necessary for these soots to have a self-ignition temperature which is sufficiently low to be frequently attained during normal operation of the engine.

SUMMARY OF THE INVENTION

It has now been determined that cerium is a valuable element for reducing the self- or auto-ignition temperature of the soots.

However, in order to be conveniently used and in order to comply with the provisions of various governmental regulations, the additives must be introduced as required from a tank which need be replaced only every 50,000 kilometers. Under these conditions, the additives must be both very concentrated and sufficiently stable as not to be detrimentally affected by the agitation promoted by operation of the vehicle and by the interval of several years between replacements.

Accordingly, a major object of the present invention is the provision of novel colloidal organic sols well suited for catalyzing the auto-ignition of soot particles, which are both very concentrated and very stable, not only when concentrated but also when diluted, and which comprise tetravalent metal oxide/organic acid complexes.

Another object of the present invention is the provision of novel colloidal organic sols which after introduction into a diesel fuel and then after combustion of same, imparts good self-ignition of the resulting soots.

Briefly, the present invention features colloidal organic sols which comprise (a) particles of a tetravalent metal oxide, (b) an amphiphilic acid system, and (c) a diluent therefor, said particles (a) having a $d_{90}$ which is not greater than 200 nanometers and said sols exhibiting at least one of the following characteristics, (1) said particles of tetravalent metal oxide comprise agglomerates of crystallites, advantageously of cerium dioxide, in which crystallites the $d_{80}$, advantageously the $d_{90}$, measured by photometric counting (high resolution transmission electron microscopy) is not greater than 5 nanometers, ninety percent (by mass) of the agglomerates comprising from 1 to 5 and preferably from 1 to 3 crystallites, and/or (2) said amphiphilic acid system (b) comprising at least one organic acid containing 11 to 50 carbon atoms having at least one branch in the $\alpha$-, $\beta$-, $\gamma$- or $\delta$-position to the atom bearing the acidic hydrogen.

DETAILED DESCRIPTION OF BEST MODE AND PREFERRED EMBODIMENTS OF THE INVENTION

More particularly according to the present invention, the most preferred sols are those having one of the characteristics (1) and (2), in toto, and at least partially satisfy the other.

In a first embodiment of the invention, it is possible to be less restrictive as regards the amphiphilic acids on condition of being more restrictive as regards the particle size conditions. Herein, the particle size characteristics are often notations of the $d_n$ type where n is a number ranging from 1 to 99. This notation is well known to many arts, but, as it is somewhat rarer in chemistry, it will now be defined. This notation represents the particle size such that n % (by weight, or more exactly by mass, since the weight is not an amount of matter but a force) of the particles is less than or equal to said size. These more restrictive conditions and the manner of responding thereto are explained below. Advantageously, at least 50% (statistical value) by mass of the agglomerates are monocrystalline, namely, they comprise only a single crystallite (or at least appear to consist only of a single crystallite when the sol is examined by HRTEM (High Resolution Transmission Electron Microscopy)).

In addition, it is possible, by varying the technique and the conditions of hydrolysis, to ensure that 80%, preferably 90%, by mass of the crystallites are of a size less than a predetermined value within the range 2 to 5 nanometers and preferably 3 to 4 nanometers.

The molar ratio of the amphiphilic acid to the metal elements of the sol is advantageously not greater than 0.5, advantageously not greater than 0.4 and preferably not greater than 0.3. In this instance, the molar ratio must be considered a functional molar ratio (namely, that mole of amphiphilic acid is the number of moles multiplied by the number n of useful acidic functional groups). More particularly, the number of acid equivalents represents the number of molecules of acid when the acid employed is monofunctional and it is necessary to double or triple this number in the event of diacids or triacids and, more generally, to multiply it by the number of acidic functional groups in the event of a polyacid.

It is desirable, in the sol, for the residual cerium(III) content with respect to cerium(IV) to be as low as possible, typically less than 1.5% and advantageously not greater than 1% and preferably not greater than ½%.

The sol advantageously has a concentration such that the cerium dioxide content (with accompanying impurities) contained ranges from 20% to 60% and preferably from 30% to 50% by mass.

The viscosity of the sol is determined by the flow time of the sol as illustrated in the examples to follow; this time is advantageously not more than one half-minute.

Thus, the cerium, optionally with its impurities, is essentially in the form of metal oxide agglomerates, optionally hydrated, which oxide(s) agglomerates are rendered liposoluble by means of the amphiphilic organic acid.

The impurities accompanying the cerium into the sol are species emanating from the cohydrolysis of metal cations with an acidic nature which usually accompany cerium (such as other rare earth metals, actinides, and the like).

By "metal cation with an acidic nature" is intended a metal cation, most often corresponding to the highest oxidation state of the metal element in question, the hydroxide of which precipitates at low pH values, preferably at a pH of less than 4. The oxidation state is most typically IV. Exemplary of the acidic cations are the cerium values and accompanying impurities usual in minerals or recycled products. In these crude mixtures, for same to be useful consistent herewith, the impurities in the cerium represent no more than 1/10, advantageously 1/20 and preferably 1/50 of the precipitable cations. These limitations are limitations of the process but, within the preferred range, any degree of purity can be chosen.

The present invention also features a process for the preparation of the subject colloidal dispersions of a cerium (IV) compound.

The subject process for the preparation of a colloidal dispersion of a compound of cerium(IV) and optionally of an acidic metal cation in organic medium, comprises the following stages:

(a) subjecting an aqueous cerium-containing phase to a hydrolysis operation to precipitate a cerium dioxide (in the broad sense);

(b) contacting the suspension of cerium dioxide resulting from Stage (a), simultaneously or consecutively, with an organic phase comprising an organic acid and preferably an organic mixture or compound serving as a solvent; and (c) recovering the organic phase therefrom, which phase constitutes a sol.

Advantageously, between Stage (a) and Stage (b), the solid particles can be separated from the mother liquors, optionally dried, preferably by atomization, and then the solid particles resuspended in an aqueous phase, which will then be subjected to Stage (b). Resuspension is carried out such that the cerium dioxide content in the aqueous phase ranges from 100 to 400 g/l.

The process for the synthesis of the compositions according to the invention will now be more fully described.

In one embodiment of the present invention, the drying indicated above is carried out by atomization, namely, by spraying the mixture of sols into a hot atmosphere (spray drying). Atomization can be carried out by means of any sprayer known per se, for example with a spray nozzle of the shower head or other type. It is also possible to employ rotary atomizers therefor. For the various spraying techniques that can be used in the subject process, see the standard text by Masters, *Spray Drying* (second edition, 1976), published by George Godwin—London).

It will be appreciated that the atomization/drying operation can be carried out by means of a "flash" reactor, for example of the type described in FR-A-2,257,326, FR-A-2,419,754 and FR-A-2,431,321, each assigned to the assignee hereof. In this instance, the treating gases (hot gases) are driven downwardly with a helical movement and flow into a vortex sink. The mixture to be dried is injected along a trajectory which is coaxial with the axis of symmetry of the helical trajectories of said gases, thus completely transferring the amount of momentum of the gases to the mixture to be treated. The gases thus provide a dual function: on the one hand, the spraying, i.e., the conversion of the initial mixture into fine droplets and, on the other, the drying of the droplets obtained. Moreover, the extremely low residence time (generally less than approximately 1/10 second) of the particles in the reactor presents the advantage, inter alia, of limiting possible risks of overheating as a result of an excessively long contact time with the hot gases. Thus, such flash atomization permits stable sols to be formed when the aqueous sols are thermohydrolyzed at "low" temperature, and even when the temperature of the gases is at least 200° C., preferably ranging from 200° to 300° C., results are obtained similar to those provided by thermohydrolysis at "high" temperature (150° C.). Hence, optimal sols according to the present invention are thus obtained.

The temperature of the drying atmosphere can vary over wide limits, and it depends especially on the mean residence time which is desired, or to which the atomized product is subjected once in the said atmosphere. The drying conditions (temperatures and/or residence times) are generally determined conventionally such as to at least obtain a complete or virtually complete removal of the residual water contained in the product, namely, considered as a whole, until a constant weight is obtained for the latter.

Particularly exemplary water-soluble cerium compounds are the salts of cerium(IV), such as the nitrates or ceric ammonium nitrates. Ceric nitrate is preferably used. A solution of cerium(IV) salts can contain, without disadvantage, cerium in the cerous state, but it is desirable for it to contain at least 85% of cerium(IV) values. An aqueous ceric nitrate solution can, for example, be obtained by reacting nitric acid with a ceric oxide hydrate, the latter being prepared conventionally by reacting a solution of a cerous salt, for example cerous carbonate, with an aqueous ammonia solution in the presence of hydrogen peroxide. Preferably, a ceric nitrate solution can be used that is obtained according to the process for the electrolytic oxidation of a cerous nitrate solution, as described in FR-A-2, 570,087.

It will be appreciated that the aqueous solution of cerium (IV) salts can have a certain initial free acidity, for example a normality ranging from 0.1 to 4N. According to the present invention, it is possible both to use an initial solution of cerium(IV) salts actually having a certain free acidity as indicated above and a solution which will have been neutralized beforehand, more or less exhaustively by addition of a base, such as, for example, an aqueous ammonia solution or, alternatively, a solution of alkali metal (sodium, potassium, and the like) hydroxides, but preferably an aqueous ammonia solution, such as to limit this acidity. It is then possible, in the latter event, to define in a practical manner a degree of neutralization (r) of the initial cerium solution by the following equation:

$$r = \frac{n3 - n2}{n1}$$

in which n1 represents the total number of moles of Ce(IV) present in the solution after neutralization; n2 represents the number of moles of OH⁻ ions actually required for neutralizing the initial free acidity provided by the aqueous cerium (IV) salt solution; and n3 represents the total number of moles of OH⁻ ions provided by addition of the base. When the "neutralization" embodiment is carried out, in all cases an amount of base is used which must necessarily be less than the amount of base which would be required to obtain complete precipitation of the hydroxide species $Ce(OH)_4$. In practice, the degrees of neutralization are thus restricted to values not exceeding 1 and preferably not exceeding 0.5. The initial mixture thus being obtained, it is then heated, in accordance with the second stage of the process according to the invention (Stage (a)).

The temperature at which the heat treatment (a), designated thermohydrolysis, is carried out advantageously ranges from 80° C. to the critical temperature of the reaction mixture, in particular from 80° to 350° C. and preferably from 90° to 200° C.

This treatment can be carried out, depending on the temperature employed, either at normal atmospheric pressure or under pressure, such as, for example, a saturated vapor pressure corresponding substantially to the temperature of the heat treatment.

When, as is preferred, the treatment temperature is selected to be greater than the reflux temperature (at ordinary pressure) of the reaction mixture (i.e., typically greater than 100° C.), for example at 120° or ranging from 150° to 350° C., the operation is then carried out in a closed chamber. The aqueous mixture containing the aforesaid species is introduced into this chamber (closed reactor, namely, an autoclave) and the necessary pressure then results solely from the heating of the reaction mixture (autogenous pressure). Under the temperature conditions indicated above, and in aqueous media, it is thus possible to specify, by way of illustration, that the pressure in the closed reactor varies from a value greater than 1 bar ($10^5$ Pa) to 200 bar ($2 \times 10^7$ Pa) and preferably ranges from 5 bar ($5 \times 10^5$ Pa) to 150 ($1.5 \times 10^7$ Pa). It is, of course, also possible to exert an external pressure which is in addition to that resulting from the heating.

The heating can be carried out either under an air atmosphere or under an inert gas atmosphere, preferably nitrogen.

The duration of the treatment is not critical and can thus vary over wide limits, for example from 1 to 48 hours and preferably from 2 to 24 hours. The increase in temperature is likewise carried out at a rate which is not critical and it is thus possible to attain the desired reaction temperature by heating the mixture, for example, for from 30 minutes to 4 hours, these values being exemplary only.

Thus, it is possible to use, as the starting solution for the thermolysis, cerium(IV) solutions, in general nitrate solutions, having the following characteristics:

| Characteristics | Possible | Advantageous Region | Preferred |
| --- | --- | --- | --- |
| Cerium content | from 1 g/l to the solubility limit | between 40 and 120 g g/l | between 60 and 100 g/l |
| Acidity | | r not greater than 1 | r between 0.5 and − 0.5 |
| Counterion to the cerium | any weakly complexing anion | oxygen-containing and non-complexing anion | nitrate |

The purpose of Stage (b) of the process of the invention is to produce an organic sol, this expression connoting the dispersion of optionally impure cerium dioxide (hereinafter cerium dioxide will sometimes be represented by the compound of the cation $M^{n+}$) in an organic medium, by transfer of said cerium dioxide into an organic phase from an aqueous phase containing the ceric compound in the colloidal state in an aqueous sol.

By "aqueous sol" is intended the colloidal dispersion of the compound of the cation $M^{n+}$ in aqueous medium and which comprises the starting material according to the invention.

In order to satisfactorily carry out the process of the invention, it is desirable for the starting aqueous sol to satisfy the following requirements:

(a) the proportion of metal in colloidal oxide (in the broad sense) form must be very high, advantageously 90%, preferably greater than or equal to 95% and, in general, as high as is possible;

(b) the concentration of colloidal oxide (in the broad sense) in the aqueous sol must be sufficient and preferably ranges from 0.1 to 3 mol/liter;

(c) the aqueous sol must have good thermal stability and must not flocculate at the reaction temperature which is greater than 60° C. and most typically ranges from 80° C. to the boiling point (depending on the pressure).

The liquid organic medium employed in the process of the invention is advantageously an inert aliphatic or cycloaliphatic hydrocarbon, or mixture thereof, such as, for example, mineral or petroleum spirits or mineral or petroleum ethers which can also contain aromatic constituents. Exemplary thereof are hexane, heptane, octane, nonane, decane, cyclohexane, cyclopentane, cycloheptane and liquid naphthenes. Aromatic solvents such as benzene, toluene, ethylbenzene and xylenes are also suitable, as well as petroleum cuts of Solvesso type (registered trademark of Exxon), especially Solvesso 100 which essentially contains a mixture of methylethyl- and trimethylbenzene and Solvesso 150 which comprises a mixture of alkylbenzenes, in particular of dimethylethylbenzene and of tetramethylbenzene.

Chlorinated hydrocarbons can also be used, such as chloro- or dichlorobenzene and chlorotoluene, as well as aliphatic and cycloaliphatic ethers, such as diisopropyl ether or dibutyl ether, and aliphatic and cyloaliphatic ketones such as methyl isobutyl ketone, diisobutyl ketone or mesityl oxide.

The esters too may be used, but they present the disadvantage that there is a risk of being hydrolyzed. Exemplary such esters are those prepared from the acids according to the present application with C1 to C8 alcohols such as isopropanol.

The organic liquid or solvent system will be selected by taking into account the solubilizing organic acid used, the heating temperature and the final application of the colloidal dispersion or solution. In certain instances, it is preferable to employ a mixture of solvents. The amount of liquid or solvent obviously determines the final concentration. It is more economic and more convenient to prepare more concentrated dispersions which can be diluted later, at the time of their actual use. It is for this reason that the amount of solvent is not critical.

It may be advantageous to add a promoter to the organic phase whose function is to accelerate transfer of the colloids from the aqueous phase to the organic phase and to improve the stability of the organic sols thus obtained. Exemplary such promoters are compounds containing an alcohol functional group and, very particularly, linear or branched aliphatic alcohols having from 6 to 12 carbon atoms, such as 2-ethylhexanol, decanol, dodecanol, or mixture thereof.

The proportion of the promoter in the organic phase is not critical and can vary over wide limits.

However, a proportion ranging from 2% to 15% by weight is generally very suitable.

Whereas the number of useful acids is very large, the total number of carbon atoms in the molecule in order to obtain good dissolution is, however, rather more restrictive. The total (average number if the acid used is a mixture) number of carbon atoms of the acids is advantageously greater than 6 and preferably greater than 10 and it is also desirable that it be less than approximately 60.

If high cerium, or equivalent, concentrations are desired, it is advantageous to select acids which have as short a chain as possible.

These acids can be linear or branched. It is preferable, however, for the branchings to be either distant from the carboxyl functional group or not very numerous and carried or borne by different carbons. Carboxylic acids which are suitable for the present invention can be arylic, aliphatic or arylaliphatic acids. They can be substituted by other functional groups, provided that these functional groups are stable in the media in which it is desired to employ the cerium compounds according to the present invention.

In order for the sol to remain useable at low temperature, below room temperature or indeed below zero degree Centigrade, it is preferable for the melting point of the acid or of the mixture of acids, to not be greater than 50° C., advantageously not greater than room temperature and preferably not greater than zero degrees Centigrade.

Thus, carboxylic acids can be employed in which the carbon chain is substituted by ketone functional groups, such as pyruvic acids substituted in the α-position to the ketone functional group. α-Halocarboxylic acids or α-hydrocarboxylic acids can also be used. The chain bonded to the carboxyl group can contain sites of unsaturation. However, in general, the tendency is to avoid too many double bonds because cerium catalyzes crosslinking of the double bonds. The chain can also be interrupted by ether or ester functional groups provided that the lipophilicty of the backbone chain bearing the carboxyl group is not excessively detrimentally affected.

Aliphatic carboxylic acids, aliphatic sulfonic acids, aliphatic phosphonic acids, alkylarylsulfonic acids and alkylarylphosphonic acids having from about 10 to about 40 carbon atoms can thus be used, whether natural or synthetic. These can be used either singly or in admixture.

Exemplary thereof are the fatty acids of tallol, coconut oil, soybean oil, tallow oil or linseed oil, oleic acid, linoleic acid, stearic acid and isomers thereof, pelargonic acid, capric acid, lauric acid, myristic acid, dodecylbenzenesulfonic acid, 2-ethylhexanoic acid, naphthenic acid, hexoic acid, toluenesulfonic acid, toluenephosphonic acid, laurylsulfonic acid, laurylphosphonic acid, palmitylsulfonic acid and palmitylphosphonic acid. Oleic acid or alkarylsulfonic acids are the preferred.

The amount of amphilphilic organic acid used, expressed as number of moles of acid per mole of oxide (in the broad sense), can vary over wide limits advantageously ranging from $1/10$ to 1 mol per mole of cerium dioxide. The upper limit is not critical, but it is not necessary to employ any additional acid. The organic acid is preferably used in a proportion of $1/5$ to $4/5$ mol per mole of cerium dioxide.

In the organic phase, the proportion between the organic solvent and the organic acid is not critical. The ratio by weight of the organic solvent to the organic acid preferably ranges from 0.3 to 2.0. The order of introduction of the various reactants is immaterial. The colloidal aqueous dispersion(s), the organic acid, the organic solvent and optionally the promoter can be mixed simultaneously. The organic acid, the organic solvent and optionally the promoter, which constitute the organic phase, can also be premixed. The temperature of the reaction mixture preferably ranges from 60° C. to 150° C.

In certain instances, due to the volatility of the organic solvent, there is reason to condense its vapors by cooling to a temperature below its boiling point. The operation is advantageously carried out at a temperature ranging from 60° to 120° C. and preferably from 90° to 110° C.

The reaction mixture is maintained stirred throughout the heating, which can be from less than one hour to approximately one day and preferably from 2 hours to half a day.

At the end of the aforesaid heating period, the heating is terminated. The presence of two phases is observed: an organic phase containing, in dispersion, the metal oxide/organic acid complex and a residual aqueous phase.

The organic phase and the aqueous phase are then separated according to conventional techniques: settling, centrifuging, and the like.

In accordance with the present invention, colloidal organic dispersions of metal oxide(s) are obtained in which the size of the colloids can be very varied and can be controlled by varying certain parameters, especially the diameter of the starting colloidal aqueous dispersions, which depends on the conditions selected for thermohydrolysis.

For certain applications, the reaction mixture can be used as is, but in certain instances it is desirable to remove the water which can represent from 1% to 3% by weight of the organic phase. To this end, techniques well known to thus art are employed, for example transfer through a drying agent (including a hydrophobic membrane filter), or the addition of a third solvent which is inert with respect to the $M^{n+}$ compound, which has a boiling point preferably less than 100° C. and which forms an azeotrope with water, followed by distillation of the azeotrope thus obtained. Exemplary third solvents suitable for the invention include aliphatic hydrocarbons, such as hexane or heptane, cycloaliphatic or aromatic hydrocarbons, or alcohols such as, for example, ethanol, ethylene glycol, diethylene glycol, and the like.

Preferably, especially for applications as an adjuvant or additive for diesel fuel, the aforesaid water content is at most 1%, advantageously at most 1 part per thousand, and more preferably at most 100 ppm.

The second embodiment will now be more fully described, namely great constraint in respect of the amphiphilic acids, but less limitations in respect of the basic essentials of the particles. It will be appreciated that the sols behave best when one system of constraints is complemented at least partially by the other system.

The preferred range is from 15 to 25 carbon atoms for the acids of said amphiphilic system.

When the system is a mixture of acids, the carbon atom number can be a fraction since it is then an average or mean and the constraints on the averages are advantageously the same as those above for one of the, or the, constituent(s) of the amphilphilic system. The minimum constraint is that the average of the carbon atoms of the acids of the amphilphilic system is at least equal to 10 carbon atoms. More specifically, the average of the carbon atoms of the acids of the amphilphilic system advantageously ranges from 11 to 25 and preferably from 15 to 25.

In order to obtain better results, especially when the chain length is short (less than 14 carbon atoms) and when there is only one site of branching, and especially when it is in a position γ or δ to the atom bearing the acidic hydrogen, it is very desirable for this branching to be at least two carbon atoms and advantageously three.

To explain the nomenclature of the positions, examples of di(2-ethylhexyl) hydrogen phosphate and of 2-ethyloctanoic acid are given below:

It is preferable that the longest linear moiety be at least 6 and preferably 8 carbons.

It is advantageous for the $pK_a$ of at least one of the acids to be not greater than 5 and preferably not greater than 4.5.

It is advantageous for the side chain(s) of the branched acids to contain at least two carbon atoms and preferably three carbon atoms.

It is preferable, especially when the acids are carboxylic acids, for the amphilphilic acid system to be a mixture of acids. In this event, the conditions regarding the branching must apply to at least half, advantageously two thirds and preferably four fifths, by moles, of the constituent acids of said amphilphilic acid(s) system.

Exemplary acids providing very good results are the acids containing phosphorus, such as phosphoric acids, especially diesters of phosphoric acid, phosphonic acids and monoesters thereof, and phosphinic acids.

Exemplary carboxylic acids providing good results are the isostearic acids. The acidic system is advantageously isostearic acid itself.

The starting melting point of the amphilphilic acid(s) system is advantageously less than 50° C., more advantageously less than or equal to 20° C. and preferably not greater than 0° C.

For good stability and for good extraction, it is desirable for the molar ratio of the extractant to the tetravalent metal, preferably cerium, to range from 0.1 to 0.6 and preferably from 0.2 to 0.4. This ratio increases when the size of the particles decreases.

In order to obtain particularly stable sols, as it has been demonstrated that the presence of coarse particles adversely affected the long-term stability of the sols according to the present invention, or even of the sols produced from more conventional acids, it is preferable for not more than 5%, advantageously not more than 1% and preferably not more than 0.5% by mass of the tetravalent metal oxide particles to be not greater than 0.1 micrometer in size, advantageously not greater than 0.05 micrometer and preferably not greater than 0.02 micrometer.

Any diluent that produces a stable sol can be used.

The sols according to the present invention can be used for many applications. According to the desired use, a compromise should be selected by taking account of the technical data below; for synthesis and stability, it is desirable to avoid highly non-polar hydrocarbons, such as, for example, non-cyclic aliphatic hydrocarbons. Diluents having a polar functional group such as esters or ethers, provide good results but, for certain uses, possibly should be avoided as far as possible. Mixing diluents can introduce a solution by compensating for the non-polarity of certain solvents by the addition of polar compounds, generally solvents.

In a particularly advantageous embodiment of the present invention, the sol is used to form a dilute sol in a diesel fuel. The starting sol is generally very concentrated, which limits

| | Position: | | | | |
|---|---|---|---|---|---|
| (H functional group) | α-(atom) | β-(atom) | γ-(atom) | δ-(atom) | -(atom) |
| HO | —PO(OC$_8$H$_{17}$) | —O | —CH2 | —CH(C$_2$H$_5$) | —CH$_2$(C$_3$H$_7$) |
| HO | —CO | —CH(C$_2$H$_5$) | CH2 | CH$_2$ | CH$_2$(C$_3$H$_7$) | the latitude in the selection thereof. Moreover, for reasons of compatibility with diesel fuel and its many additives, the diluents preferably then have little polarity. As constituent components of a diluent, aromatic or aliphatic compounds are preferable to compounds having a polar functional group, such as, for example, ester or ether functional groups.

It is preferable for the diluents to have a kauributanol value (measured according to ASTM standard D II 33) of less than 105 and advantageously of less than 90.

For use as a charged additive, it is preferable for the melting point of the diluents, or mixtures of diluents, to be low and to correspond to the melting point constraints described herein with respect to the amphiphilic acid system.

It is also preferable for these diluents to have a solubility in water which is very low, preferably less than 5% by mass, preferably not more than 1% and more preferably at most equal to 0.05 by mass.

Correspondingly, it is also preferable for the water to be soluble to not more than 5%, preferably to not more than 0.5% in the diluent.

Exemplary preferred diluents include aromatic hydrocarbon compounds and mixtures thereof, as well as aliphatic compounds and mixtures thereof containing less than 50%, preferably less than 25% or more preferably less than 1% of aromatic compounds.

The tetravalent metal oxides can contain relatively low proportions of metals having other valencies. In general, the proportion of addition elements, or of impurities, which is contained in the tetravalent metal particles does not exceed 10% by mass and more generally does not exceed 5% by mass.

The tetravalent metal content of the sol according to the invention is advantageously not greater than $\frac{2}{3}$ by mass and preferably ranges from 30% to 40% (mass). For use as an additive in charged diesel fuel, it is preferable for the content not to be below $\frac{1}{6}$ and preferably $\frac{1}{5}$.

The organic sols according to the present invention are characteristically prepared in known manner by heating an aqueous sol containing the tetravalent metal oxide in the presence of the diluent and of the amphilphilic acid system.

In a particularly advantageous embodiment of the invention, care should be taken that there are no excessively coarse particles in the aqueous sol and thus in the final sol.

Removal of the particles of coarsest sizes can be carried out by any technique permitting selective removal of the coarsest particles. This removal can be carried out on the aqueous sol, on the organic sol, or on both.

However, it is preferable that at least one separation be conducted on the aqueous sol. The preferred technique is centrifugation. A centrifugation for the aqueous sol corresponding to 1,000 to 10,000 G for one hour generally provides good results. However, it is possible to employ centrifugation ranging up to 50,0000 G; the limit is only a limit technological in nature.

It should be appreciated that centrifugation prior to the stage of forming the organic sol, often designated the extraction stage, promotes the latter.

The aqueous sols are advantageously prepared by hydrolysis, preferably by thermohydrolysis. Exemplary such techniques which can be used according to the present invention, are those described in EP-A-97,563, assigned to the assignee hereof. Others are described in EP-A-206,907.

The sols according to the present invention have a concentration of cerium(IV) compound which can be very high, ranging up to 3.5M to 4M of $CeO_2$. It is observed that the extraction yield of cerium into the organic phase is very good and can attain values of 90% to 95%.

By quasi-electric light scattering techniques, colloids are revealed having a hydrodynamic diameter which varies with the conditions of preparation and which is less than 100 Å (i.e., the detection limit of the currently available measuring devices).

The organic sols thus produced have excellent stability. No settling is observed after several months.

In a preferred embodiment of the present invention, the sol is such that, adjusted to a concentration of cerium metal values of 30%, the viscosity of the sol at 25° C. is not greater than 20 mPa.s, advantageously not greater than 15 mPa. and preferably not greater than 10 mPa.s.

It is also preferred that the counter-ions comprising the solution of the cerium values of the sol not be present in any of the sols of the invention in amounts greater than 0.1, advantageously 0.05 and preferably 0.03 equivalents per 100 grams of cerium dioxide. This is especially the case for the superficial layer of crystallites, a layer of pentaatomic thickness.

This viscosity can be measured by low shear in a Contraves apparatus, by varying the rate gradient from 0.01 to 1.

The organic sols thus obtained can be diluted to provide concentrations of 10 to 500 and preferably of 50 to 200 ppm. The diluent is advantageously a fuel for an internal combustion engine, preferably a diesel engine; the invention, thus, also features sols in which the organic phase consists essentially of diesel fuel and additives therefor.

The organic sols according to the invention are also useful as drying agents for paints and varnishes, as they accelerate drying of unsaturated oils, as well as combustion adjuvants for liquid motor fuels or fuels for power generators such as internal combustion engines, oil burners or jet engines. The sols according to the invention are also useful in cosmetics.

In order to further illustrate the present invention and the advantages thereof, the following specific examples are given, it being understood that same are intended only as illustrative and in nowise limitative.

EXAMPLES

First Embodiment

Reactants

Except when otherwise indicated, the reactants employed in the examples were:

(i) a ceric nitrate preneutralized to r=+0.5 (cf. EP-A-153,227, assigned to the assignee hereof);

(ii) an oleic acid extracting agent, which can be replaced without modification by olein (70% oleic acid+30% linoleic acid);

(iii) a solvent, Solvesso 150, which is not specific and can be replaced by Isopar L, hexane, or even diesel fuel.

General Procedure

Except when otherwise indicated, the procedure of the examples was the following:

A first stage entailed the synthesis of the precursor which was an aqueous sol of $CeO_2$ colloids, the size of which (TEM) ranged from 3 to 5 nm.

The ceric nitrate aqueous solution with r=+0.5 was placed in a covered tantalum autoclave. The concentration of the solution was 80 g/l, expressed as $CeO_2$. Autoclaving was carried out at 160° C. for 4 hours with a temperature increase thereto over 1 hour. Stirring was maintained throughout the operation.

On completion of the autoclaving, the product settled and was then separated (filtered and dried via suction) from the mother liquors. It was then redispersed in water, thus providing a stable aqueous sol. The concentration of this sol was 150 g/l.

Example 1

Reactants (i) a ceric nitrate preneutralized to r=+0.5 and at a cerium concentration of 80 g/l;

(ii) an oleic acid extracting agent.

First Stage

The Cerelec solution with r=+0.5 was placed in a covered tantalum autoclave. The concentration of the solution was 80 g/l, expressed as $CeO_2$. Autoclaving was carried out a 160° C. for 4 hours with a temperature increase over 1 hour.

Stirring was maintained throughout the operation.

The solution obtained was filtered on sintered glass, no. 4.

The product was then redispersed in water, thus providing a stable aqueous sol. The concentration of this sol was 150 g/l.

In a second stage, colloids were transferred from the aqueous phase to the organic phase.

A quantitatively determined amount of $CeO_2$ aqueous sol was placed into a round-bottom flask to which was added the organic mixture which was such that the oleic acid/cerium molar ratio was 0.3 and the Solvesso 150/oleic acid ratio was 3.75.

In this example, the respective amounts were:

(i) 24.8 g of $CeO_2$ (i.e., 0.165 l of sol at a concentration of 150 g/l);

(ii) 12.2 g of oleic acid;

(iii) 45.7 g of Solvesso 150.

The mixture was then heated at 100° C. at reflux for approximately 10 hours. After cooling, the organic phase was separated from the aqueous phase and then filtered on a hydrophobic filter.

The exact assay of the sol was then measured by calcination (solids content after 6 hours at 950° C.).

A sol was thus obtained with a measured stability greater than 4 months (duration of the sample), the $CeO_2$ concentration of which was 29.1% (mass) and the colloid size of which (measured by TEM) ranged from 3 to 5 nm.

Example 2

The procedure of Example 1 was repeated. The proportions of the various reactants were adjusted such as to obtain a stable sol with a particle size of 3 to 5 nm, the characteristics of which were:

(a) $CeO_2$ content of 47% (mass);

(b) oleic acid/cerium ratio of 0.25.

Example 3

The procedure of Example 1 was repeated as regards the transfer into the organic phase, but which differed therefrom in the preparation stage of the aqueous phase.

The red ceric nitrate solution was thermohydrolyzed under standard conditions (concentration of 80 g/l, temperature of 100° C., r=0.5). After separation from the mother liquids the thermohydrolysis hydrate was redispersed in water and then dried by atomization (Büchi atomizer, inlet temperature 240° C., outlet temperature 120° C.).

After this drying stage, the product remained perfectly dispersible. It was used for preparing the aqueous $CeO_2$ sol which was used as the precursor in the transfer to the organic phase.

The sol thus synthesized was perfectly stable; its colloid size (TEM) ranged from 3 to 5 nm and its $CeO_2$ content was 39% (mass).

The viscosity of the organic sols was determined by measuring the flow time of 1 ml of sol in a Prolabo® pipette of exactly 1 ml (always the same).

The results obtained are reported in Table 1 which follows:

TABLE 1

| Cerium sol | Cerium dioxide content | Oleic/Ce | Time in seconds |
| --- | --- | --- | --- |
| Precursor hydrolyzed at 100° C. | 30% | 0.20 | 35.6 |
| Precursor hydrolyzed at 100° C. | 30% (28.1) | 0.30 | 41.1 |
| Precursor hydrolyzed at 150° C. | 40% (36..) | 0.20 | 17.4 |
| Precursor hydrolyzed at 150° C. | 40% (34.7) | 0.30 | 22.3 |
| Precursor hydrolyzed at 150° C. | 40% (37..) | 0.30 | 26.3 |
| Precursor hydrolyzed at 160° C. | 40% (39.7) | 0.20 | 22.6 |
| Sol of example No.4 (known viscosity = to 10 mPa · s) | 40% | isostearic 0.30 | 21 |

The hydrolysis temperature, the olein/cerium ratio and the true $CeO_2$ level all influence the viscosity at the same time.

Second Embodiment

In General

The synthesis of the organic cerium sol was carried out in two stages: the synthesis of a cerium hydrate which was redispersible to form an aqueous cerium sol and then transfer of the sol into the organic phase.

Synthesis of the Aqueous Sol

This technique comprised a conventional synthesis by thermohydrolysis of a cerium(IV) nitrate aqueous solution containing 80 g/l of cerium oxide preneutralized with aqueous ammonia to provide a ratio R=[OH⁻]/[Ce] close to 0.5. The cerium oxide concentration was in the region of 80 g/l. After four hours of thermohydrolysis at 150° C. in a autoclave, the precipitate of cerium hydrate type was recovered by filtration.

The hydrate was then resuspended in water. A fraction of the product was dispersed in the sol form, the remainder forming a moderately stable suspension. A concentration of 160 g/l was generally attained. The pH of the solution was acidic (less than pH=1).

A second type of precursor was also used. The cerium(IV) solution, still preneutralized at R=0.5, was this time thermohydrolyzed at 100° C. for four hours. After filtering the hydrate, the precipitate was taken up again in water to form a sol which was dried by atomization (Büchi or LEA). The dried hydrate was lastly resuspended to provide a stable sol at a concentration of 160 g/l.

Transfer of the Sol Into the Organic Phase

Transfer of the sol into the organic phase was accomplished using an extracting agent diluted in an organic solvent. The molar ratio of the extractant to the cerium was 0.3 for a total amount of cerium on the order of 40%, as $CeO_2$ (i.e., 32.5% as cerium metal), in the final organic phase.

The aqueous sol described above was intimately contacted with the organic phase and then, with slow stirring, the solution was progressively heated to 100° C. (reflux of water).

The synthesis was carried out in two separate phases:

Exchange: the organic phase, initially lighter than the aqueous sol, became progressively cloudy. Exchange appeared to take place very quickly and the organic phase, becoming more dense, then descended to the bottom of the reactor. When the two phases had a similar density, a significant emulsion formed and it was then advisable not to stir the reactor too vigorously, in order to limit this phenomenon.

At the end of the exchange, the aqueous phase became clear again, whereas the organic phase remained cloudy. The duration of this phase varied from 2 to 4 hours depending on the nature of the precursors.

Maturation: once the exchange was complete, a stage of maturation (or aging) was carried out, during which the organic phase released the nitrates and water molecules entrained by the hydrate aggregates during transfer. The organic phase progressively became clear and it was observed that nitrous vapors were being given off. Finally, a stable, perfectly clear organic sol which was black in color with red glints was obtained. The maturation phase was of variable length but, under the conditions followed, was seldom less than 6 hours.

In the laboratory, the sol was recovered by filtration on a hydrophobic filter and then centrifuged to remove possible agglomerates responsible for slight deposition of certain products with time.

Example 4
Extraction With Isostearic Acid, 150° C. Sol

Synthesis of the aqueous sol: 415 ml of a cerium(IV) nitrate aqueous solution (1.4 mol/l, 0.58 mol/l of free acid, d=1.433) were neutralized with 835 ml of a 0.64 mol/l aqueous ammonia solution at the rate of 0.5 $OH^-/Ce/h$, such as to provide a solution containing 80 g/l of $CeO_2$ preneutralized to R=[$OH^-$]/[Ce]=0.5.

The solution was then placed in an autoclave, heated to a temperature of 150° C. over one hour and then maintained at 150° C. for four hours. After cooling, the hydrate obtained was filtered (sintered glass #4) and the oxide content determined by weight loss on ignition at 900° C. 40 g of cerium oxide in hydrate form were taken up again in 250 ml of water to obtain an aqueous sol having a concentration of 160 g/l.

Synthesis of the organic sol: to form 100 g of sol, 19.9 g of isostearic acid (ISA) were diluted in 40.1 g of Solvesso (aromatic petroleum cut), to provide an ISA/Ce molar ratio of 0.3 and a final $CeO_2$ concentration in the organic phase of 40%. The organic phase was contacted with the aqueous phase with gentle stirring and the mixture was then heated to reflux (100°–103° C.) for 15 h. The organic phase, after separation by settling, was filtered on a hydrophobic filter and then optionally centrifuged at 4,500 rev/min.

The sol obtained, with a cerium oxide concentration of 40% by mass, had a clear black color with red glints. It was perfectly stable.

Change of Viscosity as a Function of Time

The viscosity was measured by low shear in a Contraves apparatus, by varying the rate gradient from 0.01 to 1. In all cases, the viscosity of the additive was independent of the rate gradient. The measurement was carried out in a sol at 25° C. with a metal content of 30%.

The following Table 2 reports the change in the viscosity as a function of time for the sol thus prepared.

TABLE 2

| Duration of aging (days) | Viscosity of the additive in mPa · s (uncertainty of ± 1 mPa · s) | |
|---|---|---|
| | closed flask | open flask |
| 0 (temperature of −18° C.) | 150 | — |
| 0 | 10 | 10 |
| 68 | 11 | 11 |
| 118 | 10 | 11 |
| 165 | 10.5 | 11.7 |
| 292 | 9.5 | 12.8 |
| 330 | 9 | 13 |

Example 5 (Comparative)
Extraction With Oleic Acid, 150° C. Sol

The procedure of Example 1 was repeated, except as regard the organic phase which comprised 19.7 g of oleic acid (OA, extractant) and 40.3 g of Solvesso (diluent).

The sol obtained was less stable since a slight deposit appeared after a few days at the bottom of the flask (deposit containing especially cerium oxide).

Example 6
Extraction With Isostearic Acid, 100° C. Sol

Synthesis of the aqueous sol: 415 ml of a cerium(IV) nitrate aqueous solution (1.4 mol/l, 0.58 mol/l of free acid, d=1.433) were neutralized with 835 ml of a 0.64 mol/l aqueous ammonia solution at the rate of 0.5 $OH^-/Ce/h$, to provide a solution containing 80 g/l of $CeO_2$ preneutralized to R=[$OH^-$]/[Ce]=0.5.

The solution was then heated to reflux for 4 h and the hydrate obtained was then filtered. It was resuspended at 150 g/l in water and then atomized on a Büchi (800 ml/h, inlet temperature: 240° C., outlet temperature: 130° C.).

Lastly, the hydrate was dissolved at 160 g/l before being extracted with an organic phase under the same conditions as for Example 1.

The sol obtained, which was black in color, but not clear, was not very stable insofar as a yellow deposit appeared after a few hours.

When the organic sol was centrifuged at 4,500 rev/min for one hour, the sol was then significantly more stable insofar as the deposit had not appeared after several days.

Example 7
Extraction With Isostearic Acid, 100° C. Sol

The procedure of Example 3 was repeated, except that the aqueous sol was centrifuged at 4,500 rev/min for one hour to remove the particles of a size greater than 60 nm, probably poorly dissolved during the synthesis. The organic sol obtained after extraction was then much more stable than that of Example 3, especially insofar as no deposition was observed after several weeks of storage.

The change in the viscosity was the same as that of Example No. 4, to within the uncertainty of the measurement.

Example 8 (Comparative)
Extraction With 2-ethylhexanoic Acid, 150° C. Sol

The procedure of Example 1 was repeated, except that the extraction was carried out with an organic phase containing 10 g of 2-ethylhexanoic acid and 50 g of Solvesso. After extracting for more than 25 h, a cloudy organic sol was obtained, the stability of which did not exceed a few days (deposition of particles at the base of the flask).

Example 9 (Comparative)
Extraction With 3,5,5-trimethylhexanoic Acid

The procedure of Example 1 was repeated, except that the extraction was carried out with an organic phase containing 11 g of 3,5,5-trimethylhexanoic acid and 49 g of Solvesso. After extracting for several hours, a yellow putty was formed at the base of the round-bottom flask. Synthesis of the sol was not possible using this type of extractant, unsubstituted in the α-position to the carboxylic acid group.

This example, by comparison with the above comparative example, evidenced that when a pure acid is used and that when the closest branching to the acidic functional group is both methyl and γ to the H functional group (compare the Table above), the results are significantly less favorable.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A stable organic sol comprising:

particles of cerium dioxide (IV) in the form of agglomerates of crystallites, the $d_{80}$ of the crystallites is no greater than 5 nanometers, and 90% of the agglomerates containing 1 to 5 crystallites;

an amphiphilic acid system containing at least one acid whose total number of carbons is at least 10; and an organic diluent medium, wherein the sol is obtained by a process comprising of the following steps:

(a) subjecting an aqueous phase of a cerium salt (IV) to a thermohydrolysis operation by heating this phase at a temperature ranging between 80° C. and the critical temperature of the aqueous phase, so as to precipitate the cerium dioxide;

(b) contacting the cerium dioxide aqueous suspension resulting from step (a) with the amphiphilic acid system and the organic diluent medium; and (c) recovering the organic sol.

2. The organic sol as set forth in claim 1, wherein the $d_{90}$ of the crystallites is no greater than 5 nanometers.

3. The organic sol as set forth in claim 1, wherein step (b) is conducted simultaneously with step (a).

4. The organic sol as set forth claim 1, wherein step (b) is conducted subsequent to step (a).

5. The organic sol as set forth in claim 1, wherein the process further comprises, between steps (a) and (b), separating the cerium dioxide from the aqueous phase and drying the cerium dioxide, followed by resuspending the dried cerium dioxide in aqueous phase, which suspension is then subjected to step (b).

6. The organic sol as set forth in claim 1, wherein the process further comprises subjecting the aqueous suspension to centrifugation.

7. The organic sol as set forth in claim 1, wherein the process further comprises subjecting the organic sol to centrifugation.

8. The organic sol as set forth in claim 1, wherein 80% of the crystallites have a size smaller than 2–5 nanometers.

9. The organic sol as set forth in claim 1, wherein at least 80% of the crystallites have a size smaller than 3–4 nanometers.

10. The organic sol as set forth in claim 1, wherein at least 90% of the crystallites have a size smaller than 2–5 nanometers.

11. The organic sol as set forth in claim 1, wherein at least 90% of the crystallites have a size smaller than 3–4 nanometers.

12. The organic sol as set forth in claim 1, wherein no more than 5%, of the cerium dioxide (IV) particles are of a size that is greater than 0.1 micrometer.

13. The organic sol as set forth in claim 1, wherein the sol contains residual cerium (III) in an amount less than 1.5% relative to the cerium (IV).

14. The organic sol as set forth in claim 13, wherein the amount of cerium (III) is no more than 1% relative to the cerium (IV).

15. The organic sol as set forth in claim 13, wherein the amount of cerium (III) is no more than 0.5% relative to the cerium (IV).

16. The organic sol as set forth in claim 1, wherein the amount of cerium dioxide contained in the sol is between 20 and 60% by mass.

17. The organic sol as set forth in claim 16, wherein the amount of cerium dioxide contained in the sol is 30 to 50% by mass.

18. The organic sol as set forth in claim 1, wherein the amphiphilic acid system comprises a mixture of acids.

19. The organic sol as set forth in claim 1, wherein amphiphilic acid system contains at least one acid with 11 to 50 carbon atoms, presenting at least one alpha, beta, gamma or delta branching of the acid carrying the acidic hydrogen.

20. The organic sol as set forth in claim 1, wherein the acid of the amphiphilic acid system presents at least one branching containing at least 2 carbon atoms.

21. The organic sol as set forth in claim 20, wherein the at least one branching contains at least 3 carbon atoms.

22. The organic sol as set forth in claim 1, wherein at least one of the acids of the amphiphilic acid system presents a pKa that is no greater than 5.

23. The organic sol as set forth in claim 22, wherein the pKa is no greater than 4.5.

24. The organic sol as set forth in claim 1, wherein the amphiphilic acid system contains isostearic acid.

25. The organic sol as set forth in claim 1, wherein the amphiphilic acid system is a diester of phosphoric acid.

26. The organic sol as set forth in claim 1, wherein the sol is such that, adjusted to a concentration of 30% cerium metal, the viscosity of the sol at 25° C. is not greater than 20 mPa.s.

27. The organic sol as set forth in claim 26, wherein the viscosity of the sol is not greater than 15 mPa.s.

28. The organic sol as set forth in claim 26, wherein the viscosity of the sol is not greater than 10 mPa.s.

29. The organic sol as set forth in claim 1, wherein the viscosity of the sol is such that it takes at least one half minute for one ml of the sol to flow.

30. The organic sol as set forth in claim 1, wherein the organic diluent medium comprises a petroleum-based product including additives.

31. The organic sol as set forth in claim 1, wherein the organic diluent medium contains no more than 50% aromatic compounds.

32. The organic sol as set forth in claim 31, wherein the organic diluent medium contains no more than 20% aromatic compounds.

33. The organic sol of claim 1, wherein the thermohydrolysis operation is conducted at a temperature ranging between 80° C. and 350° C.

34. A fuel for an internal combustion motor, wherein the fuel comprises a mixture of the organic sol as set forth in claim 1 with a petroleum-based fuel.

35. A method of using the organic sol as set forth in claim 1, comprising mixing the sol with a petroleum-based fuel.

36. A method of preparing an organic sol comprising the following steps:
   (a) subjecting an aqueous phase of a cerium salt (IV) to a thermohydrolysis operation by heating this phase at a temperature ranging between 80° C. and the critical temperature of the aqueous phase, so as to precipitate cerium dioxide;
   (b) contacting the cerium dioxide aqueous suspension resulting from step (a) with an amphiphilic acid system and an organic diluent medium; then
   (c) recovering the organic sol.

37. The method of claim 36, wherein step (b) is conducted simultaneously with step (a).

38. The method of claim 36, wherein step (b) is conducted subsequent to step (a).

39. The method as set forth in claim 36, wherein the thermohydrolysis operation takes place at a temperature ranging between 80° C. and 350° C.

40. The method as set forth in claim 36, wherein step (b) is carried out at a temperature ranging between 60° C. and 150° C.

41. The method as set forth in claim 36, wherein the method further comprises, between steps (a) and (b), separating the cerium dioxide from the aqueous phase and drying the cerium dioxide, followed by resuspending the dried cerium dioxide in aqueous phase, which suspension is then subjected to step (b).

42. The method as set forth in claim 36, wherein the method further comprises: subjecting the aqueous suspension to centrifugation.

43. The method of claim 36, wherein the method further comprises subjecting the organic sol to centrifugation.

44. A stable organic sol comprising:
   particles of cerium dioxide (IV) in the form of agglomerates of crystallites, the $d_{80}$ of the crystallites is no greater than 5 nanometers, and 90% of the agglomerates containing 1 to 5 crystallites;
   an amphiphilic acid system containing at least one acid whose total number of carbons is at least 10; and
   an organic diluent medium;
   wherein the stability of the sol is such that the viscosity of the sol varies by no more than approximately 5 mPa.s when aged in an open flask.

45. The sol of claim 44, wherein the viscosity of the sol varies by no more than approximately 5 mPa.s when aged for a period of approximately 330 days.

46. The organic sol as set forth in claim 44, wherein the $d_{90}$ of the crystallites is no greater than 5 nanometers.

47. The organic sol as set forth in claim 44, wherein 80% of the crystallites have a size smaller than 2–5 nanometers.

48. The organic sol as set forth in claim 44, wherein at least 80% of the crystallites have a size smaller than 3–4 nanometers.

49. The organic sol as set forth in claim 44, wherein at least 90% of the crystallites have a size smaller than 2–5 nanometers.

50. The organic sol as set forth in claim 44, wherein at least 90% of the crystallites have a size smaller than 3–4 nanometers.

51. The organic sol as set forth in claim 44, wherein no more than 5%, of the cerium dioxide (IV) particles are of a size that is greater than 0.1 micrometer.

52. The organic sol as set forth in claim 44, wherein the sol contains residual cerium (III) in an amount less than 1.5% relative to the cerium (IV).

53. The organic sol as set forth in claim 52, wherein the amount of cerium (III) is no more than 1% relative to the cerium (IV).

54. The organic sol as set forth in claim 52, wherein the amount of cerium (III) is no more than 0.5% relative to the cerium (IV).

55. The organic sol as set forth in claim 44, wherein the amount of cerium dioxide contained in the sol is between 20 and 60% by mass.

56. The organic sol as set forth in claim 55, wherein the amount of cerium dioxide contained in the sol is 30 to 50% by mass.

57. The organic sol as set forth in claim 44, wherein the amphiphilic acid system comprises a mixture of acids.

58. The organic sol as set forth in claim 44, wherein amphiphilic acid system contains at least one acid with 11 to 50 carbon atoms, presenting at least one alpha, beta, gamma or delta branching of the acid carrying the acidic hydrogen.

59. The organic sol as set forth in claim 44, wherein the acid of the amphiphilic acid system presents at least one branching containing at least 2 carbon atoms.

60. The organic sol as set forth in claim 59, wherein the at least one branching contains at least 3 carbon atoms.

61. The organic sol as set forth in claim 44, wherein at least one of the acids of the amphiphilic acid system presents a pKa that is no greater than 5.

62. The organic sol as set forth in claim 61, wherein the pKa is no greater than 4.5.

63. The organic sol as set forth in claim 44, wherein the amphiphilic acid system contains isostearic acid.

64. The organic sol as set forth in claim 44, wherein the amphiphilic acid system is a diester of phosphoric acid.

65. The organic sol as set forth in claim 44, wherein the sol is such that, adjusted to a concentration of 30% cerium metal, the viscosity of the sol at 25° C. is not greater than 20 mPa.s.

66. The organic sol as set forth in claim 65, wherein the viscosity of the sol is not greater than 15 mPa.s.

67. The organic sol as set forth in claim 65, wherein the viscosity of the sol is not greater than 10 mPa.s.

68. The organic sol as set forth in claim 44, wherein the viscosity of the sol is such that it takes at least one half minute for one ml of the sol to flow.

69. The organic sol as set forth in claim 44, wherein the thinner comprises a petroleum-based product including additives.

70. The organic sol as set forth in claim 44, wherein the organic diluent medium contains no more than 50% aromatic compounds.

71. The organic sol as set forth in claim 70, wherein the organic diluent medium contains no more than 20% of aromatic compounds.

72. A fuel for an internal combustion motor, wherein the fuel comprises a mixture of the organic sol as set forth in claim 44 with a petroleum-based fuel.

73. A method of using the organic sol as set forth in claim 44, comprising mixing the sol with a petroleum-based fuel.

74. A prolongedly settling-resistant, storage- and viscosity-stable, whether confined in a closed container or exposed to the ambient atmosphere, clear colloidal organic sol suited for catalyzing the ignition of soot particles emanating from an internal combustion engine, comprising: particulates of cerium dioxide liposolubilized and suspended in a liquid organic diluent medium, the tetravalent metal oxide particulates having a controlled particle size $d_{90}$ no greater than 200 nanometers and being complexed with a liposolubilizing amount of at least one amphiphilic organic acid, and the tetravalent metal oxide particulates comprising agglomerates of crystallites, the $d_{80}$ of which being no greater than 5 nanometers, at least 90% of the agglomerates comprising from 1 to 5 crystallites and at least 50% by mass of the agglomerates appearing to comprise a single crystallite.

75. The sol of claim 74, wherein the viscosity of the sol varies by no more than approximately 5 mPa.s when aged for a period of approximately 330 days.

76. The organic sol as set forth in claim 74, wherein the $d_{90}$ of the crystallites is no greater than 5 nanometers.

77. The organic sol as set forth in claim 74, wherein 80% of the crystallites have a size smaller than 2–5 nanometers.

78. The organic sol as set forth in claim 74, wherein at least 80% of the crystallites have a size smaller than 3–4 nanometers.

79. The organic sol as set forth in claim 74, wherein at least 90% of the crystallites have a size smaller than 2–5 nanometers.

80. The organic sol as set forth in claim 74, wherein at least 90% of the crystallites have a size smaller than 3–4 nanometers.

81. The organic sol as set forth in claim 74, wherein no more than 5% of the cerium dioxide (IV) particles are of a size that is greater than 0.1 micrometer.

82. The organic sol as set forth in claim 74, wherein the sol contains cerium (IV) and residual cerium (III), and the residual cerium (III) is present in an amount less than 1.5% relative to the cerium (IV).

83. The organic sol as set forth in claim 82, wherein the amount of cerium (III) is no more than 1% relative to the cerium (IV).

84. The organic sol as set forth in claim 82, wherein the amount of cerium (III) is no more than 0.5% relative to the cerium (IV).

85. The organic sol as set forth in claim 84, wherein the at least one amphiphilic organic acid contains isostearic acid.

86. The organic sol as set forth in claim 74, wherein the amount of cerium dioxide contained in the sol is between 20 and 60% by mass.

87. The organic sol as set forth in claim 86, wherein the amount of cerium dioxide contained in the sol is 30 to 50% by mass.

88. The organic sol as set forth in claim 74, wherein the at least one amphiphilic organic acid comprises a mixture of acids.

89. The organic sol as set forth in claim 74, wherein the at least one amphiphilic organic acid contains at least one acid with 11 to 50 carbon atoms, presenting at least one alpha, beta, gamma or delta branching of the acid carrying the acidic hydrogen.

90. The organic sol as set forth in claim 74, wherein the at least one amphiphilic organic acid presents at least one branching containing at least 2 carbon atoms.

91. The organic sol as set forth in claim 90, wherein the at least one branching contains at least 3 carbon atoms.

92. The organic sol as set forth in claim 74, wherein the at least one amphiphilic organic acid presents a pKa that is no greater than 5.

93. The organic sol as set forth in claim 92, wherein the pKa is no greater than 4.5.

94. The organic sol as set forth in claim 74, wherein the at least one amphiphilic organic acid is a diester of phosphoric acid.

95. The organic sol as set forth in claim 74, wherein the sol has a viscosity at 25° C. of not greater than 20 mPa.s, when having a concentration of 30% cerium metal.

96. The organic sol as set forth in claim 95, wherein the viscosity of the sol is not greater than 15 mPa.s.

97. The organic sol as set forth in claim 95, wherein the viscosity of the sol is not greater than 10 mPa.s.

98. The organic sol as set forth in claim 74, wherein the viscosity of the sol is such that it takes at least one half minute for one ml of the sol to flow.

99. The organic sol as set forth in claim 74, wherein the diluent comprises a petroleum-based product including additives.

100. The organic sol as set forth in claim 74, wherein the diluent contains no more than 50% aromatic compounds.

101. The sol of claim 74, wherein the at least one amphiphilic organic acid comprises from 11 to 50 carbon atoms and is branched in at least one of the α, β, γ, or δ positions relative to the atom bearing the acidic hydrogen.

102. A fuel for an internal combustion motor, wherein the fuel comprises a mixture of the organic sol as set forth in claim 74 with a petroleum-based fuel.

103. A method of using the organic sol as set forth in claim 74, comprising mixing the sol with a petroleum-based fuel.

* * * * *